United States Patent Office 3,200,878
Patented Aug. 17, 1965

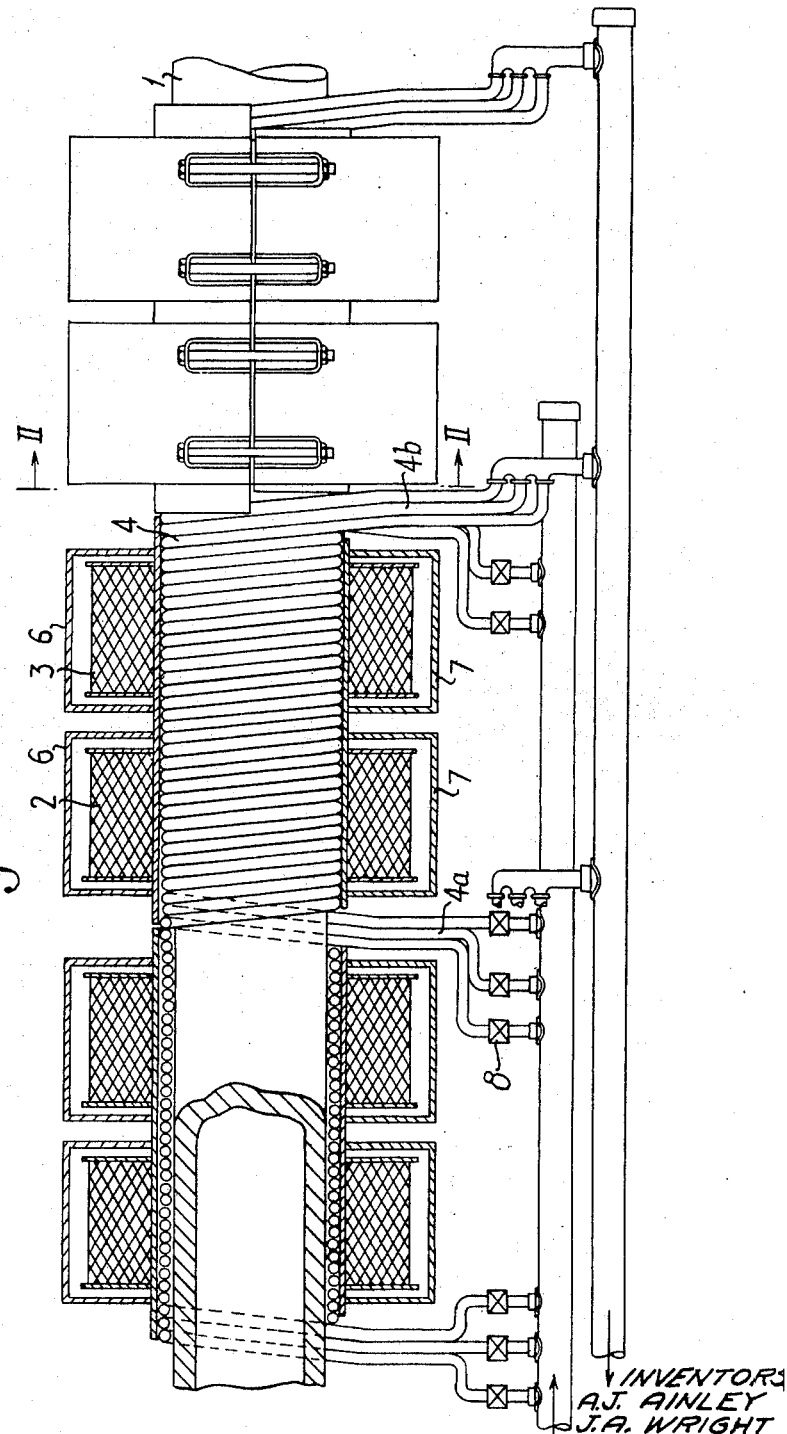

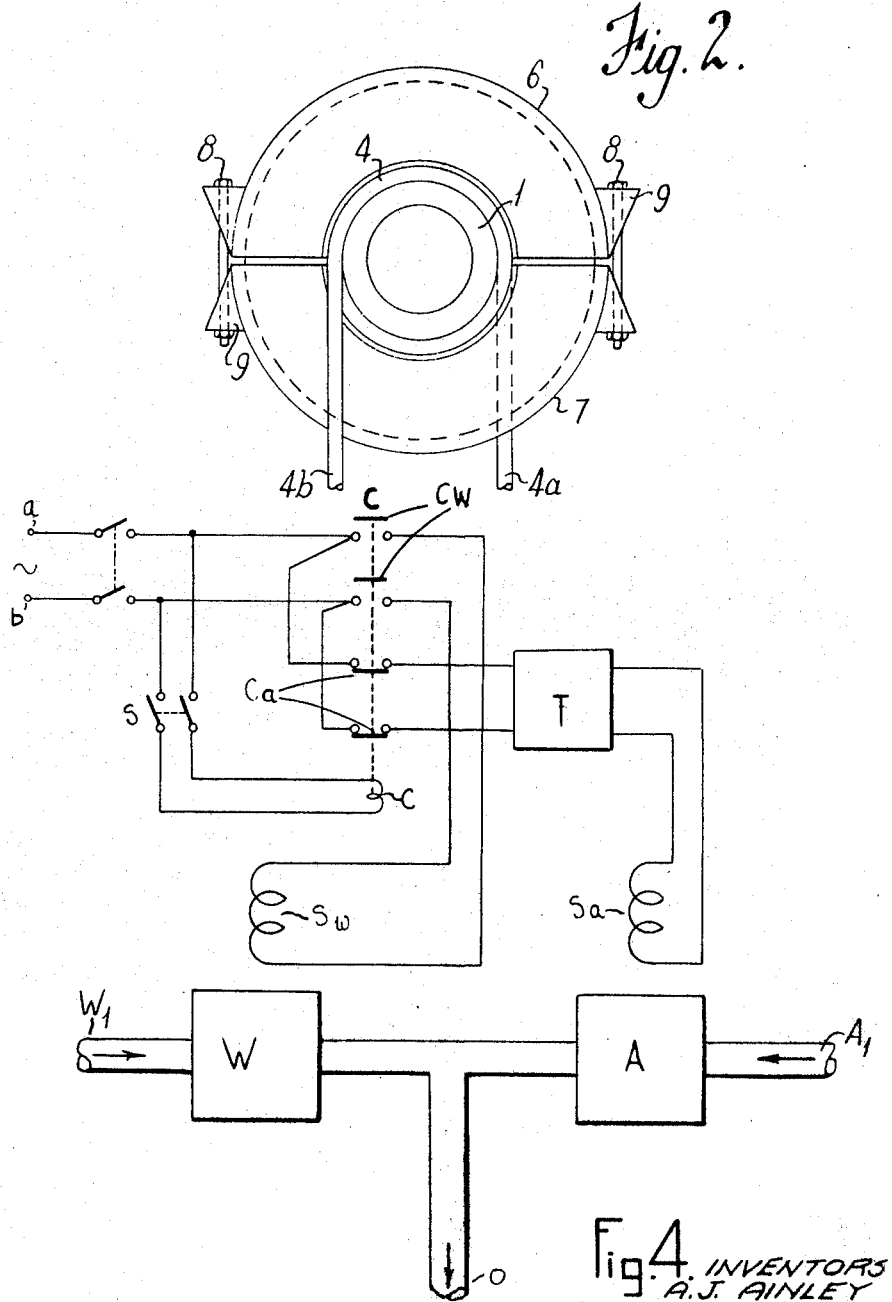

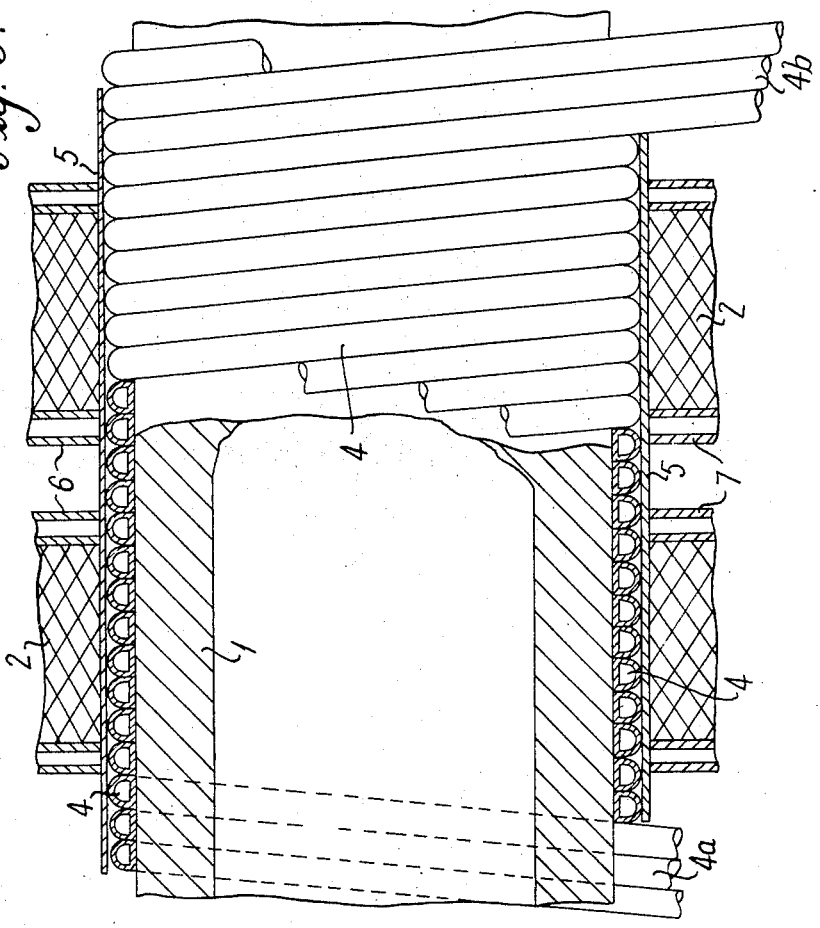

3,200,878
MEANS FOR CONTROLLING THE WORKING TEMPERATURE IN MACHINES OPERATING UPON PLASTIC MATERIALS
Alfred John Ainley, Stretford, Manchester, John Albert Wright, Timperley, and Ellis Heap, Crest, Rochdale, England, assignors to Associated Electrical Industries Limited, London, England, and The General Engineering Company (Radcliffe) Limited, Manchester, England, both British companies
Filed Oct. 4, 1961, Ser. No. 142,876
Claims priority, application Great Britain, Oct. 5, 1960, 34,155/60
8 Claims. (Cl. 165—64)

The invention relates to means for controlling the working temperatures in machines operating upon plastic materials and is especially concerned with the cooling arrangements. Among examples of such machines are plastic extrusion and plastic injection moulding machines in which the heated plastic material is forced along a cylinder, known in the art as a barrel, by a rotating core formed as a screw thread conveyor, and, in some injection moulding machines, by a ram.

Electrical heating units, for example a primary induction coil or coils, surrounding the extrusion cylinder, are commonly used for heating the extrusion cylinder, and, since heat is also generated in the cylinder by the working of the plastic material, the problem arises of maintaining a temperature which is low enough to maintain the plastic material in the proper condition.

Proposals have therefore been made to cool the surface of the cylinder, and if necessary also the heating unit, by providing a jacket for cooling fluid, for example water. The known arrangements may be such that the cooling water circulates around the outer surface of the extrusion cylinder in annular ducts formed between the said cylinder surface and the insulated induction coil.

According to the present invention the cylinder of the machine is provided with tubular cooling coils wrapped around the cylinder. The cross-section of the said coils may be deformed by flattening to obtain an increased surface contact area with the cylinder. The diameter of the eye of the coils is, preferably at the same time, made slightly undersize with respect to the outside diameter of the cylinder so that the resilience of the coils may be made use of to obtain a tight grip on the cylinder. This construction provides adequate contact area whilst allowing the equipment to be readily dismantled as required.

According to a further feature of the invention a convenient number of tubular coils, the rate of flow through which is controllable for each individual coil, are intermeshed to form a multi-start helix.

To avoid blockage by deposited sediment of any coil, which is temporarily not in use for cooling purposes, means for automatic scavenging of the coil by compressed air are provided.

In one preferred construction the cooling is zoned along the length of the tube, the cooling zones being arranged at suitable intervals. The cooling coils may be made from a suitable material such as Inconel tubing, and a set of coils for one cooling zone comprises three individual coils with a pitch of three times, or greater, the tube diameter so that they can be intermeshed to form a three start coil with three inlet connections at one end and three outlet connections at the other. At this stage with round section coils assembled on the extrusion cylinder, only line contact could be obtained and to increase the contact area it may therefore be necessary to flatten the section of the tubes. After the flattening operation the diameter of the eye of the coils is left slightly smaller than the outside diameter of the cylinder so that when assembled onto the outside of the cylinder the coils will grip it tightly. The elastic properties of a material such as Inconel will ensure that this grip is maintained under all operating conditions.

An example of a construction according to the invention will now be more precisely described with reference to the simplified accompanying diagrammatic drawings in which:

FIG. 1 shows an assembly of a three-zone temperature-control for an extruder barrel partly in section in a plane containing the axis of the barrel;

FIG. 2 shows an end view of the assembly illustrated in FIG. 1, and

FIG. 3 shows on a larger scale a section of only the central temperature control zone.

FIG. 4 is a diagram of a valve control circuit.

Referring now to the drawings, a temperature-control arrangement for the cylindrical extruder extruder barrel 1 comprises a suitable number of control zones, the assembly shown in FIG. 1 being comprised of three similar zones capable of group control and of being individually controlled.

As shown the central control zone is identified by the pair of induction coils, 3 and the set of previously shaped cooling coils 4 wrapped round the barrel. The cooling coil inlets are shown at 4a and the corresponding outlets at 4b. The cooling coils are covered by upper and lower clamping plates 5 and each induction coil is enclosed within upper and lower half-housings 6 and 7 secured upon the plates 5 by bolts 8 engaging flanges 9. The entire construction may be in stainless steel, except for the cooling tubes 4, which may be of "Inconel." The control zones at either side of the central zone above described are of identical construction.

In operation the three inlets 4a of the set of cooling coils 4 will be supplied from a common head of water through individual valves 8 and cooling will be controlled by using one, two or all three of the coils as necessary. Similarly control is available for the zones on each side of the central zone.

The invention is not limited to the construction particularly described above. In some extruders it may be found appropriate to use a greater number of intermeshed cooling coils per zone instead of three. For the coils it is possible to use any non-magnetic stainless material of high resistivity. The material known as "Inconel" is, however, readily available in tubing of suitable lengths.

The upper and lower clamping plates 5 and the half-housings 6, 7 may be magnetisable and may be of mild steel. Alternatively, only the half-housings 6 and 7 may be of mild steel and the clamping plates 5 may be of stainless steel. When a coil is not in use the surplus water trapped inside the tubing would boil away and leave behind deposited impurities which would decrease the efficiency of cooling and eventually cause a blockage. To prevent this from happening a compressed air supply is provided through separate valves interlocked, preferably electrically, with the water control valves in such a way that when a water valve is closed the corresponding air valve opens to allow the air pressure to eject the water before deposition takes place. A timing device closes the air valve after a predetermined time has elapsed.

FIG. 4 is a simplified schematic diagram of an electric control circuit for the valves controlling the admission of water to the cooling coils and of air scavenging purposes.

Referring to the drawing the control circuit is fed from an alternating current supply at the terminals $a$, $b$ and comprises a contactor C, the coil $c$ of which is controlled by the toggle switch S. Sets of contacts $C_w$ and $C_a$ in the contactor C are connected respectively to the solenoid $S_w$ of water valve W and through a timer T to the solenoid $S_a$ controlling the normally closed air valve A. $A_1$ is the air supply line, $W_1$ is the water supply line and O is the outlet to the cooling coils wrapped around the barrel, for example the cooling coils such as 4 shown in FIG. 1 and 3.

When the toggle switch S is operated, the contactor C closes the circuit to the solenoid $S_w$ of the normally closed water valve W allowing water to flow through the coils 4. At the same time contacts $C_a$ in the circuit to the timer T are opened allowing the timing relay in the timer to reset without operating the normally closed air valve A. On completion of cooling, the toggle switch S is turned off opening the circuit to the valve W and stopping the flow of water. At the same time the circuit through contactor C to the timer T is closed, thus operating the timing relay which in turn opens valve A allowing air to flow through the coils 4. After a period of, say, 10 to 15 seconds the timing relay switches off and closes valve A, after which the system remains in readiness for the next cycle of cooling.

The primary induction coils are separately wound and, afterwards assembled over the clamping plates 5. Each primary coil 2, 3 is wound upon a coil former (not shown) in layers with suitable flexible insulating material interleaved between each layer. After the coil has been completely wound, it is removed from the former and is given an external insulation by applying a lapped winding of suitable insulating tape in toroidal fashion around the coil to completely seal the coil. If the insulating materials employed include heat-curable resins, the self-supporting coil is then subjected to a final heat treatment in known manner, the temperature and other conditions of the heat treatment depending upon the nature of the insulating materials which have been used. After the cooling coils 4 have been fitted to the barrel and the clamping plates 5 have been fitted in position, the complete coil is then introduced in position by sliding it over the clamping plates. The heating unit half-housings 6, and 7 are then clamped in position. The sections 4a and 4b of the cooling coils 4 which are to serve as the inlets and outlets are unwound from the extruder barrel 1 after the fitting of the induction coils has been completed.

Conversely if the induction coils are required to be withdrawn, the cooling coils are removed at the same time.

What we claim is:

1. Apparatus for controlling the working temperature in machines for operating upon plastic material of the kind in which plastic material is forced along an electrically heated cylinder, comprising a cylinder, helical tubular cooling coils for conveying a cooling liquid, said coils being wrapped in helical formation around and directly in contact with said cylinder and each fed with a supply of said cooling liquid, a cylindrical sleeve directly in contact with and surrounding the cooling coils, and at least one electrical induction heating coil placed around the cylindrical sleeve, said heating coil having a housing enclosing the coil and clamped to the external surface of the cylindrical sleeve.

2. Apparatus for controlling the working temperature in machines for operating upon plastic material of the kind in which plastic material is forced along an electrically heated cylinder and having a zone where the temperature is to be controlled, comprising a cylinder, a plurality of separate tubular cooling coils for conveying a cooling liquid, said coils being wrapped in helical formation around and directly in contact with said cylinder arranged to form a multi-start helix by intermeshing a common water supply head, each of said coils having a separate inlet connection to said common water supply head and a separate outlet, a cylindrical sleeve directly in contact with and surrounding the cooling coils, and at least one electrical induction heating coil placed around the cylindrical sleeve.

3. Apparatus according to claim 1 comprising a number of similar heating and cooling units axially spaced at zones along the cylinder, each including at least one induction coil and a set of cooling coils with an inlet and an outlet therefor.

4. Apparatus according to claim 3 comprising at least three similar heating and cooling units.

5. Apparatus according to claim 2, including automatic means for scavenging the residual cooling water from any of said coils not in use for cooling purposes when the water supply is cut off from said coils.

6. Apparatus according to claim 5, wherein the means for automatic scavenging of said cooling coils comprises a compressed air supply and an arrangement of water supply control valves linked with separate valves controlling the compressed air supply interconnected such that upon the closing of a water control valve the corresponding compressed air valve is opened to allow the air pressure to eject residual water in the respectively connected cooling coil.

7. Apparatus according to claim 6, including a timing device for closing the said air supply valve after the elapse of a predetermined time interval.

8. Apparatus according to claim 1, wherein the turns of the cooling coils are flattened to improve heat transfer between the coils and the external surface of the cylinder.

References Cited by the Examiner

UNITED STATES PATENTS

| | | | |
|---|---|---|---|
| 2,166,188 | 7/39 | Turner | 165—169 X |
| 2,330,326 | 9/43 | Atkeson | 257—229 |
| 2,471,317 | 5/49 | Fausek et al. | 257—229 |
| 2,796,632 | 6/57 | Willert | 257—288 |
| 2,868,938 | 1/59 | Barfield | 219—10.51 X |
| 2,888,251 | 5/59 | Dalin | 165—156 X |
| 2,893,055 | 7/59 | Wenzel | 257—303 |
| 2,904,664 | 9/59 | Rothacker | 18—12 |

ROBERT A. O'LEARY, *Primary Examiner.*

H. B. THORNTON, CHARLES SUKALO, *Examiners.*